United States Patent
Mori et al.

(10) Patent No.: US 8,725,312 B2
(45) Date of Patent: May 13, 2014

(54) SYSTEM FOR OBTAINING INFORMATION IN VEHICLE

(75) Inventors: Tetsuya Mori, Kobe (JP); Daiyu Mikita, Kobe (JP); Satoshi Horii, Nishinomiya (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/571,163

(22) Filed: Aug. 9, 2012

(65) Prior Publication Data

US 2013/0041522 A1 Feb. 14, 2013

(30) Foreign Application Priority Data

Aug. 12, 2011 (JP) .................. 2011-176591
Aug. 12, 2011 (JP) .................. 2011-176592

(51) Int. Cl.
| | | |
|---|---|---|
| G06F 17/00 | (2006.01) | |
| H04L 9/32 | (2006.01) | |
| H04L 9/00 | (2006.01) | |
| H04W 12/12 | (2009.01) | |
| H04L 29/06 | (2006.01) | |

(52) U.S. Cl.
CPC ......... *H04L 9/3271* (2013.01); *H04L 2209/043* (2013.01); *H04L 9/002* (2013.01); *H04W 12/12* (2013.01); *H04L 63/1416* (2013.01)
USPC ............... 701/1; 713/176; 713/181; 713/189; 709/224

(58) Field of Classification Search
CPC . H04L 9/3271; H04L 2209/043; H04L 9/002; H04L 63/1416; H04W 12/12
USPC ......................... 701/1; 714/49, 805, E11.043; G9B/7.01, 27.012, 27.019, 7.005, G9B/E5.064, 11.047, 23.092, 7.067, 23.088; 375/E7.129, E7.135, E7.14, E7.163, 375/E7.17, E7.176, E7.19, E7.211, E7.241; 382/175, 306; 709/224; 713/176, 181, 713/189
See application file for complete search history.

(56) References Cited

U.S. PATENT DOCUMENTS

| | | | |
|---|---|---|---|
| 6,185,490 B1 | 2/2001 | Ferguson | |
| 6,931,309 B2 * | 8/2005 | Phelan et al. | 701/1 |
| 7,553,173 B2 * | 6/2009 | Kowalick | 439/133 |
| 8,078,722 B2 * | 12/2011 | Harvey et al. | 709/224 |
| 8,340,855 B2 * | 12/2012 | Chinnadurai et al. | 701/29.1 |

(Continued)

FOREIGN PATENT DOCUMENTS

| | | |
|---|---|---|
| EP | 1197426 A1 | 11/2001 |
| EP | 2026287 A2 | 2/2009 |

(Continued)

*Primary Examiner* — McDieunel Marc
(74) *Attorney, Agent, or Firm* — Alleman Hall McCoy Russell & Tuttle LLP

(57) ABSTRACT

An information obtaining system in a vehicle is provided. The information obtaining system includes a nonvolatile memory built into the vehicle, vehicle information relating to the vehicle being stored in the nonvolatile memory; a portable reader device which is not incorporated into the vehicle and can be carried by a person, the portable reader device being configured to read out the vehicle information from the nonvolatile memory, encrypt the vehicle information, and store the encrypted vehicle information, and being capable of outputting the encrypted vehicle information; and an analyzing device which is not incorporated into the vehicle, the analyzing device being separate from the portable reader device, and configured to decrypt the encrypted vehicle information output from the portable reader device into the vehicle information.

19 Claims, 8 Drawing Sheets

(56) References Cited

U.S. PATENT DOCUMENTS

| | | | |
|---|---|---|---|
| 8,429,423 B1* | 4/2013 | King et al. | 713/193 |
| 8,463,953 B2* | 6/2013 | Davis et al. | 710/16 |
| 8,473,176 B2* | 6/2013 | Youngquist et al. | 701/101 |
| 2004/0252837 A1* | 12/2004 | Harvey et al. | 380/270 |
| 2007/0152503 A1* | 7/2007 | Kowalick | 307/10.1 |
| 2008/0194951 A1* | 8/2008 | Poland | 600/437 |
| 2008/0214022 A1* | 9/2008 | Kowalick | 439/34 |
| 2009/0306839 A1* | 12/2009 | Youngquist et al. | 701/14 |

FOREIGN PATENT DOCUMENTS

| | | |
|---|---|---|
| JP | 2001030971 A | 2/2001 |
| JP | 2001328580 A | 11/2001 |
| JP | 2004171480 A | 6/2004 |
| JP | 2006101290 A | 4/2006 |
| JP | 2008310764 A | 12/2008 |
| JP | 2008310765 A | 12/2008 |
| JP | 2008310766 A | 12/2008 |
| WO | 2005038747 A1 | 4/2005 |

* cited by examiner

SYSTEM FOR OBTAINING INFORMATION IN VEHICLE

CROSS-REFERENCE TO RELATED APPLICATIONS

The present application claims priority to and the benefit of Japanese Patent Application Nos. 2011-176591 filed on Aug. 12, 2011 and 2011-176592 filed on Aug. 12, 2011, which are hereby incorporated by reference in its entirety for all purposes.

BACKGROUND OF THE INVENTION

1. Field of the Invention

The present invention generally relates to a system for obtaining predetermined information about a vehicle. Particularly, the present invention relates to a method that reads information from a memory built into the vehicle and provides the information to an analyzing device or the like.

2. Description of the Related Art

Conventionally, an event data recorder (EDR) is known, which is built into an automobile to record information relating to driving (see, for example, Japanese Laid-Open Patent Application Publication No. 2008-310764). When the event data recorder detects a shock (impact) with a predetermined level or higher using an acceleration sensor, it stores in ROM (read only memory), information output from devices incorporated in the automobile before and after a time point when the shock is detected. By analyzing the information stored in the memory, it becomes possible to understand abnormal states different from normal driving states of the automobile, such as a shock with a predetermined level or higher, rapid braking, or a rapid change in a vehicle speed. Based on the abnormal driving states, driving situations can be analyzed.

However, in the above stated system, to obtain the information from the EDR, the automobile must be transported to a particular facility such as a maintenance company, a computer must be connected to a diagnostic connector of the EDR, and data (information) must be downloaded from the memory to the computer. Transporting the automobile to the particular facility is troublesome. If the automobile suffers from some failure or damage, it is unable to go to the facility under its own power. Thus, in many occasions, it is difficult to move the automobile to the facility.

As a possible solution to this, the data may be downloaded from the memory of the EDR using a portable device such as a laptop computer. In that case, information downloaded to the portable device might be re-written inadvertently, or a portion of the information might be missing. If the credibility of the information becomes impaired in this manner, the driving state of the automobile may not be analyzed accurately.

SUMMARY OF THE INVENTION

The present invention addresses the above described condition, and an object of the present invention is to easily obtain information from a memory in an EDR or the like built into a vehicle, and ensure credibility of the information to be obtained.

According to one aspect of the present invention, an information obtaining system in a vehicle comprises a nonvolatile memory built into the vehicle, vehicle information relating to the vehicle being stored in the nonvolatile memory; a portable reader device which is not incorporated into the vehicle and which can be carried by a person, the portable reader device being configured to read out the vehicle information from the nonvolatile memory, encrypt the vehicle information, and store the encrypted vehicle information, and being capable of outputting the encrypted vehicle information; and an analyzing device which is not incorporated into the vehicle, the analyzing device being separate from the portable reader device, and configured to decrypt the encrypted vehicle information output from the portable reader device into the vehicle information.

In accordance with the system, firstly, predetermined vehicle information is stored in the nonvolatile memory built into the vehicle. This vehicle information is not erased but preserved in the nonvolatile memory even after a main power supply of the vehicle is turned OFF. The vehicle information may be read from the nonvolatile memory using the portable reader device and stored in an internal memory of the portable reader device. Therefore, the vehicle need not be transported to a particular facility or the like, and the vehicle information can be obtained easily.

In addition, the vehicle information read from the nonvolatile memory is encrypted and stored in the internal memory of the portable reader device as encrypted information. Therefore, before the encrypted information is provided to the analyzing device and is decrypted (decoded), the information will not be rewritten inadvertently or a portion of the information will not be missing. That is, credibility of data is very high. If a decryption program is not installed in the portable reader device, high credibility of the formation can be ensured.

The vehicle information is not limited to information used to analyze the state of driving, but may be suitable information according to uses, such as information indicating the relationship between how to use the vehicle and fuel efficiency, information used to specify the state of trouble such as a strange noise, etc. For example, abnormal state information relating to abnormal states of the vehicle and identification information used to identify the vehicle may be stored in the nonvolatile memory as the vehicle information.

In the case of a motorcycle, for example, the abnormal states may be a shock generated by the fall, or the like. In addition, the abnormal states may include moving states of the vehicle which correspond to the driver's operations which are less likely to occur in normal moving states, such as driver's excessively rapid braking operation, driver's rapid steering operation, etc., and which may possibly lead to a fall. It may be determined that the abnormal state is taking place based on initiation of known traction control (TRC control) or anti-lock braking system control (ABS control). Based on the abnormal state information, the state of the fall or the like can be understood, and analyzed. By comparison, the identification information may include a model of the vehicle, a place of destination, a vehicle body number, etc. The identification information can further improve credibility of the vehicle information.

The nonvolatile memory may be removably mounted to a controller for controlling an operation of the vehicle. For example, a semiconductor memory may be mounted to a board of the controller. In this configuration, what is needed is to add routines or the like which are executed to record vehicle information to control programs of the controller, and a dedicated recording device is unnecessary. This can achieve space saving and cost reduction. In this case, the identification information may include a model number of the controller, or the like.

The nonvolatile memory may be configured not to be rewritable. For example, as the nonvolatile memory, for example, a semiconductor memory such as a PROM (programmable ROM), or an EPROM (Erasable Programmable ROM) may be used. Thereby, information is inhibited from being rewritten or overwritten in the program executed to store the vehicle information in the nonvolatile memory, and the nonvolatile memory does not permit the information to be rewritten or overwritten. As a result, the credibility of the recorded vehicle information is further improved.

Abnormal state information relating to an abnormal state of the vehicle and normal state information relating to a normal state of the vehicle may be stored in the nonvolatile memory as the vehicle information. The normal state information may be general information which does not belong to the above stated abnormal state information, and may be information such as a driving operation indicating how the user drives the vehicle normally, a moving speed of normal driving, or their histories. By combining the normal state information with the abnormal state information, or the like, the driving state such as the fall can be analyzed with higher accuracy.

In that case, the normal state information per unit time stored in the nonvolatile memory may be less in amount than the abnormal state information per unit time stored in the nonvolatile memory. This allows useful information to be stored as much as possible in a limited storage capacity of the nonvolatile memory. The number of times the abnormal state information is recorded may be restricted to a preset number. This makes it possible to prevent the abnormal state information from being rewritten the number of times more than the preset number, and ensure a storage capacity of normal state information more easily.

The information obtaining system in the vehicle may comprise an event data recorder (EDR) incorporated into the vehicle and including a nonvolatile memory, data output from devices incorporated into the vehicle being stored in the nonvolatile memory, the event data recorder further including: a determiner system for determining whether or not the vehicle has fallen; a detecting system for detecting that a rotational speed of a drive system coupled to a driving wheel of the vehicle is equal to or higher than a predetermined value; and a controller for controlling the nonvolatile memory such that storing of the data output from the devices in the nonvolatile memory is initiated if the determiner system determines that the vehicle has fallen and the detecting system detects that the rotational speed of the drive system is equal to or higher than the predetermined value.

The determination system may determine that the vehicle has fallen, if the vehicle is banked with respect to an axis of the vehicle in a forward and rearward direction and has fallen, or when the vehicle has not fallen actually but it is detected that its attitude around the axis in the forward and rearward direction changes rapidly. It may be determined that the vehicle has fallen, based on the output signal from the falling sensor like the prior art example (see Japanese Laid-Open Patent Application Publication NO. 2008-310764), or using a device or method other than the falling sensor.

In the EDR configured as described above, the fact that the rotational speed of a drive system is high when it is determined that the vehicle has fallen, triggers storing of data of the output signals from the devices incorporated into the vehicle, in the nonvolatile memory. In other words, even when a moving speed of the vehicle is very low and is in a substantially stopped state as well as a case where the vehicle has fallen during driving, the EDR is activated if the vehicle has fallen under the state in which the rotational speed of the drive system is equal to or higher than a predetermined value. Therefore, in a case where the driving wheel spins and the vehicle falls immediately after the vehicle started on a sandy road or a swampy place, or a case where the vehicle falls under the state in which the driving wheel is rotating after the vehicle collides with an object and the moving speed decreased, the EDR is activated to record the data indicating a behavior of the vehicle during the fall. On the other hand, when the rotational speed of the drive system is less than the predetermined value, the EDR is not activated if the vehicle falls. Therefore, data is not recorded in a case where the motorcycle which is in a stopped state or is going to be stopped cannot be supported on the ground. This makes it possible to prevent data from being recorded unnecessarily, and attain higher accuracy in the activation of the EDR.

The vehicle may include a temporal storage device for storing as time-series data, at least first information relating to a driver's operation of the vehicle and included in the data output from the devices such that the first information is updated; and the controller may read out from the temporal storage device, the data output from the devices during a period of time between a time point when storing of the data in the nonvolatile memory is initiated and a time point that is a predetermined time back from the time point when storing of the data in the nonvolatile memory was initiated.

Since at least the first information relating to the driver's operation is recorded for a predetermined period of time just before the vehicle falls, the state of the fall can be understood and analyzed based on this information. The first information may relate to the driver's operations which are less likely to occur in normal moving states, such as a driver's excessively rapid braking operation, rapid steering operation, etc., and which may possibly lead to a fall. Or, the first information may not directly relate to the driver's operation, but may be information effectively used to analyze the state of the fall.

The controller may control the nonvolatile memory such that at least second information relating to a moving state of the vehicle and included in the data output from the devices is stored in the nonvolatile memory, irrespective of a result of the determination performed by the determiner system and a result of the detection performed by the detecting system. The second information may be, for example, information representing the user's normal use states or moving states of the vehicle, such as a maximum value of moving speeds of the vehicle or its distribution, or an accumulated value of the number of times the vehicle falls. Or, the second information may be general information other than the first information.

The second information such as the normal moving state which does not relate to the fall as well as the information directly relating to the falling of the vehicle like the first information is recorded in the EDR. Based on both the first information and the second information, the fall can be analyzed with higher accuracy. The fact that the second information is recorded irrespective of a result of determination by the determiner system or a result of detection by the detecting system means that the timing when the second information is recorded does not depend on the result of determination or the result of detection, for example, the second information is recorded at certain time intervals or when a main power supply of the vehicle is turned ON/OFF. This implies that the second information and the first information may be recorded at the same timing.

When the second information relating to the normal moving state is also recorded, the second information is recorded over a much longer period of time than the first information. Therefore, the second information per unit time stored in the nonvolatile memory may be less in amount than the first information per unit time stored in the nonvolatile memory. Thus, as much useful information as possible can be stored in a limited storage capacity. By comparison, data of the first information for a predetermined period of time just before the fall is preferably recorded as detailed data in a relatively short time interval. The number of times the first information is recorded may be restricted to a preset number. This makes it possible to prevent the first information from being rewritten the number of times more than the preset number, and ensure a storage capacity of the second information more easily.

The vehicle may further include the driving wheel and a driven wheel, like the motorcycle; and the first information may include information relating to a rotational speed of the driven wheel. Since the rotational speed of the driven wheel is included in the first information, a slip state or the like can sometimes be determined based on the rotational speed of the driving wheel and the rotational speed of the driven wheel, and a cause of the fall can be analyzed more easily. The second information may include information relating to the number of times the vehicle other than the motorcycle falls, because the number of times a fall occurs may be effectively used to analyze the cause of the falling.

According to another aspect of the present invention, there is provided a vehicle incorporating the above stated EDR. Also, the present invention is intended for a control method and a control program for operating the EDR as described above.

The above and further objects and features of the invention will more fully be apparent from the following detailed description with accompanying drawings.

DETAILED DESCRIPTION OF THE PREFERRED EMBODIMENTS

Hereinafter, several embodiments of the present invention will be described with reference to the drawings. Throughout the drawings, the same or corresponding components are identified by the same reference symbols and will not be described in repetition. Hereinbelow, the directions are referenced from the perspective of a driver (not shown) riding in a vehicle.

Embodiment 1

Figure 1:
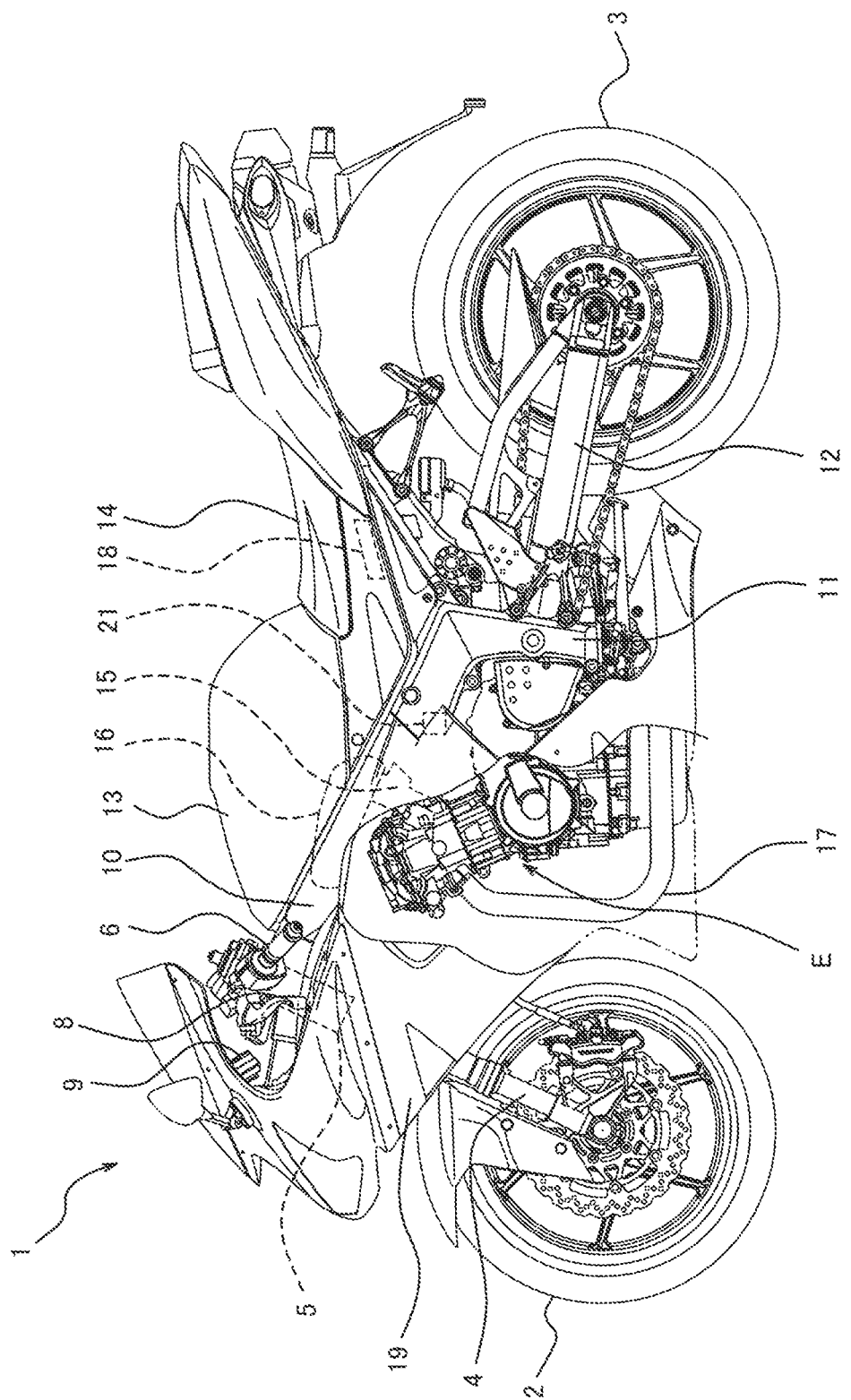
FIG. 1 is a left side view of a motorcycle according to Embodiment 1 of the present invention.

FIG. 1 is a left side view of a motorcycle 1 (vehicle) according to Embodiment 1 of the present invention. As shown in FIG. 1, the motorcycle 1 includes a front wheel 2 and a rear wheel 3. The front wheel 2 is rotatably mounted to lower end portions of a pair of right and left front forks 4 extending substantially vertically. Upper portions of the right and left front forks 4 are coupled together via a pair of upper and lower brackets (not shown), and are rotatably supported by a head pipe 5 provided on the vehicle body. A bar-type steering handle 6 extending in a rightward and leftward direction is attached to the upper bracket. The driver rotates the steering handle 6 to turn the front wheel 2 around the steering shaft.

A right grip of the steering handle 6 which can be gripped by the driver's right hand is a throttle grip (not shown). The driver rotates the throttle grip by twisting the driver's wrist to adjust a driving speed. A clutch lever 8 is attached to the steering handle 6 in a location forward relative to a left grip which can be gripped by the driver's left hand. In a location forward relative to a center of the steering handle 6 in a rightward and leftward direction, a meter unit 9 including gauges for displaying the driving speed, an engine speed and others is disposed.

A pair of right and left main frames 10 extends rearward from the head pipe 5 rearward relative to the steering handle 6 such that the main frames 10 are tilted slightly in a downward direction. Pivot frames 11 are coupled to rear portions of the main frames 10, respectively. Swing arms 12 extending in a substantially forward and rearward direction are coupled at front end portions thereof to the pivot frames 11, respectively, such that the swing arms 12 are pivotable around the front end portions. The rear wheel 3 which is a driving wheel, is rotatably mounted to rear end portions of the swing arms 12. A fuel tank 13 is disposed above the main frame 10 and a straddle-type seat 14 is disposed rearward relative to the fuel tank 13.

An engine E is positioned below the main frames 10 and mounted to the main frames 10 and the pivot frames 11. A throttle device 15 is disposed rearward relative to engine E and between the right and left main frames 10. An air cleaner box 16 is coupled to the upper portion of the throttle device 15. An exhaust pipe 17 is coupled to the front portion of the engine E and extends rearward through an underside of the engine E. A cowling 19 is provided to cover the engine E and the like including the exhaust pipe 17, from a region forward relative to the vehicle body to both side portions.

The motorcycle 1 of the present embodiment includes an ECU 18 (controller for controlling operation) for primarily controlling operation of the engine E and others, which is positioned below the seat 14. The ECU 18 is configured to execute control predetermined programs based on input information received from various sensors attached on the motorcycle 1, and provides commands to actuators of the engine E to control running of the engine E. For example, the ECU 18 provides commands to a fuel injection device and to an ignition device based on information received from a throttle position sensor, a vehicle speed sensor, an air-intake pressure sensor, and a gear position sensor, to enable the engine E to run properly.

In addition to the above, the ECU 18 of the present embodiment operates as an event data recorder for recording various vehicle information as will be described below. For example, the ECU 18 stores event data effectively used to understand a situation of falling of the motorcycle 1, when a falling sensor 21 detects that the motorcycle 1 has fallen. As the falling sensor 21, there may be used a sensor capable of detecting an acceleration or an attitude of the motorcycle 1 around a lengthwise axis of the motorcycle 1. To detect an attitude of the motorcycle 1, the falling sensor 21 contains a pendulum movement and a detection circuit which outputs a detection signal when the movement detects a rotational state which is a predetermined angle or greater.

The falling sensor 21 is configured to detect that the motorcycle 1 is banked to a predetermined angle (e.g., 65 degrees) or greater to the right or to the left. In the example shown in FIG. 1, the falling sensor 21 is secured to the inner side surface of the left main frame 10 in a location rearward relative to the engine E. After determining that the motorcycle 1 has fallen based on information received from the falling sensor 21, the ECU 18 provides commands to the actuators to stop running of the engine E. In this way, after the fall, the engine E is inhibited from running.

Event Recorder

Figure 2:
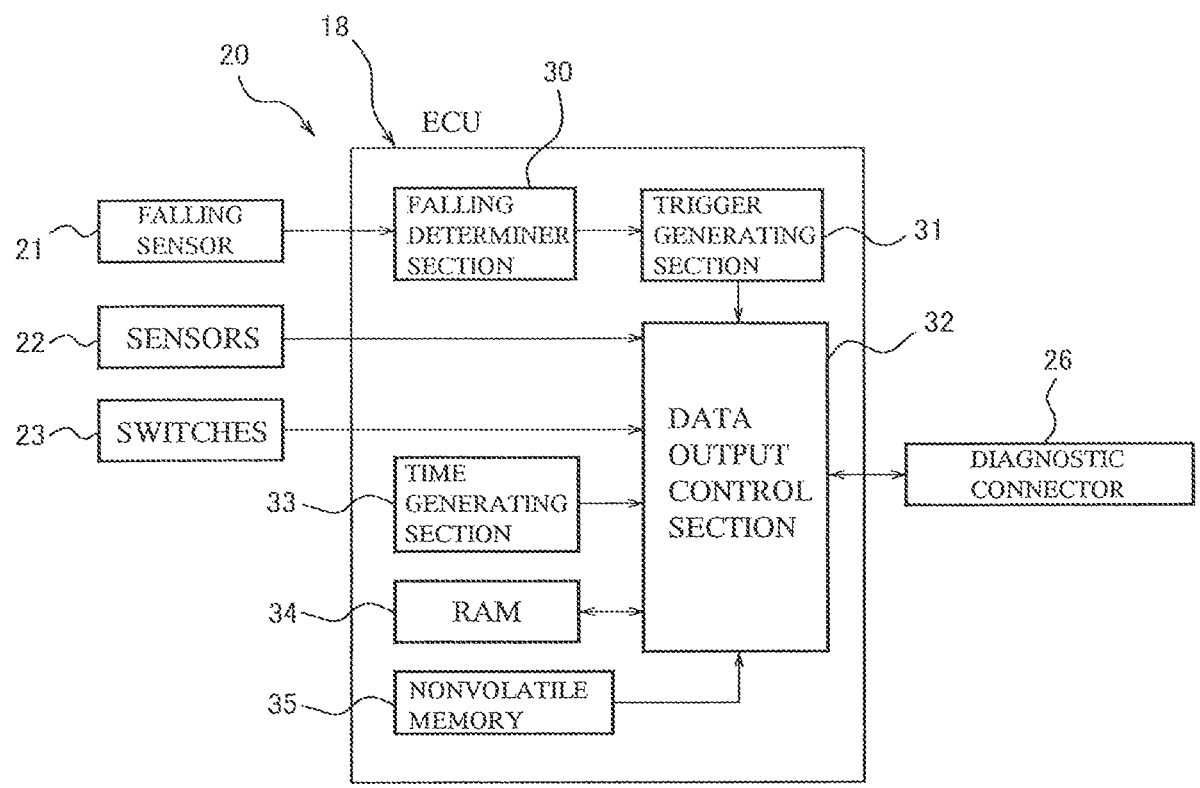
FIG. 2 is a block diagram showing an event data recorder (EDR) built into the motorcycle of FIG. 1.

FIG. 2 is a block diagram showing an event data recorder (EDR) 20 built into the motorcycle 1 of FIG. 1. The EDR 20 of the present embodiment is configured by a processor function of the ECU 18. The ECU 18 is coupled with at least sensors 22 and switches 23 in addition to the falling sensor 21. The ECU 18 is further coupled with at least an air-intake device 15 (see FIG. 1), the fuel injection device (not illustrated), the ignition device (not illustrated), etc., in the engine E.

The sensors 22 include an engine speed sensor, a throttle position sensor, a gear position sensor, a front wheel speed sensor, a rear wheel speed sensor, an acceleration sensor, a gyro sensor (bank angle detecting device), a GPS sensor, a suspension stroke sensor, a tire pneumatic sensor, a grip pressure-sensitive sensor, a seat pressure-sensitive sensor, a water temperature sensor, a hydraulic (oil pressure) sensor, a driver monitoring sensor, a two-passenger sensor, and others, although these sensors are not individually shown in the drawings. The switches 23 include a brake switch, a clutch switch, a stand switch, and others, although these switches are not individually shown in the drawings.

The engine speed sensor is configured to detect a rotational speed of a crankshaft of the engine E. The throttle position sensor is configured to detect an opening degree of a throttle valve of the throttle device 15. The gear position sensor is configured to detect a transmission gear position. The acceleration sensor is configured to detect a driving acceleration of the motorcycle 1. The gyro sensor is configured to detect an attitude of the vehicle body in such a manner that it detects an angular velocity of the vehicle body which banks to the right or to the left, and thereby detects a bank angle of the vehicle body. The GPS sensor is connected to a GPS (global positioning system) and configured to obtain positional information of the motorcycle 1. The suspension stroke sensor is configured to detect an extended/contracted state of a suspension which is a shock absorber of the motorcycle 1, and may be, for example, a displacement sensor capable of detecting a distance between the upper end portion of the suspension and the lower end portion of the suspension.

The tire pneumatic sensor operates as a pressure sensor for detecting a tire pneumatic sensor of each of the front wheel 2 and the rear wheel 3. The grip pressure-sensitive sensor is configured to detect a pressure with which the driver grips the right or left grip of the handle 6. The seat pressure-sensitive sensor is configured to detect a pressure generated by the weight of the driver straddling the seat 14. The water temperature sensor is configured to detect a temperature of cooling water. The hydraulic sensor is configured to detect pressures of hydraulic lines. The driver monitoring sensor may be a known sensor which detects a motion of the driver, such as wink. The two-passenger sensor may be a sensor for detecting a distribution of a load applied to the seat 14, a sensor for detecting that a contraction amount of a rear suspension is greater than that of a front suspension by a predetermined value or greater, or a sensor for detecting a load applied to a foot step for the passenger.

The brake switch is configured to detect whether or not a brake has been operated by the driver. The clutch switch is configured to detect whether or not the clutch has been operated. The stand switch is configured to detect a down-movement or an up-movement of a side stand configured to contact a ground surface to support the vehicle body in a state in which the vehicle body is somewhat inclined when the motorcycle 1 is parked.

The ECU 18 receives as inputs, output signals from the falling sensor 21, the sensors 22, and the switches 23, and controls the running of the engine E, or the like. In addition, the ECU 18 records data of the output signals in such a way the data are updated once in every predetermined period, and some of these data are recorded as predetermined vehicle information relating to the motorcycle 1. The ECU 18 is provided with a diagnostic connector 26 of the system. As will be described in detail later, a portable reader device 40 is coupled to the diagnostic connector 26 via a communication line 39 (see FIG. 6), to read data of the vehicle information.

More specifically, while a power supply of the motorcycle 1 is ON, a data output control section 32 in the ECU 18 stores the data of the output signals from the sensors 21, 22 and the switches 23, as time series data, and updates the data in each specified time, in RAM 34 (temporal memory from which stored data is erased unless power is ON). Predetermined data (normal state information, second information) corresponding to a normal use state of the motorcycle 1 is stored in a nonvolatile memory 35 which is configured to preserve the data even when a power is not ON. For example, if the motorcycle 1 falls, predetermined data (abnormal state information, first information) which may be associated with the fall of the motorcycle 1, is stored in the nonvolatile memory 35 as the event data.

In an exemplary configuration, the ECU 18 includes a falling determiner section 30, a trigger generating section 31, a data output control section 32, and a time generating section 33. The falling determiner section 30 is configured to determine whether or not the motorcycle 1 has fallen based on the output signal from the falling sensor 21. That is, the falling sensor 21 and the falling determiner section 30 constitute a determiner system. The trigger generating section 31 is configured to send a trigger signal to the data control section 32 if the falling determiner section 30 determines that the motorcycle 1 has fallen. The trigger generating section 31 constitutes a detecting system. The data output control section 32 reads the event data from the RAM 34 and stores the event data such that the event data is unable to be rewritten, in response to the trigger received from the trigger generating section 31. In other words, the data output control section 32 constitutes a controller which starts to store the event data in the nonvolatile memory 35, when the falling determiner section 30 determines that the motorcycle 1 has fallen. The time generating section 33 operates as a timer for sending time information indicating a present (current) time to the data output control section 32.

The RAM 34 constituted by a semiconductor memory and the nonvolatile memory 35 constituted by a semiconductor memory such as an EPROM, in which stored data is unable to be rewritten, are removably mounted on a circuit board of the ECU 18, by, for example, soldering. The data output control section 32 may read history data from the RAM 34 and store the history data in the nonvolatile memory 35 when the event data is stored in the nonvolatile memory 35 as described above. Alternatively, the data output control section 32 may store the history data irrelevantly to the determination as to the fall. For example, the history data may be read from the RAM 34 and stored in the nonvolatile memory 35 for a specified period of time by maintaining a current application state, after a power supply of the motorcycle 1 is turned OFF.

Since the history data is stored in the nonvolatile memory 35 at a time point different from a time point when the trigger is generated in the EDR 20, the frequency with which the history data is stored in the nonvolatile memory 35 can be reduced, and the volume of data stored at the fall can be lessened. Thus, the event data can be stored in the nonvolatile memory 35 in a stable condition. Moreover, history data from when the power supply is turned OFF until the trigger is generated in the EDR 20 is preferably stored in the nonvolatile memory 35 together with the event data. This allows the history data at a time point just before the fall to be stored in the nonvolatile memory 35.

For example, the nonvolatile memory 35 has a storage area of the history data and a storage area of the event data. Especially, for the event data, two storage areas are set in the nonvolatile memory 35 for the purpose of "mirroring". Therefore, even if the system is electrically unstable due to a shock or the like at the fall, after the fall of the motorcycle 1 triggers the output control section 32's operation for storing the event data in the nonvolatile memory 35, the data in the two storage areas may be compared to each other, thus ensuring credibility of the data.

Alternatively, data of identification information used to identify the motorcycle 1 may be stored in the nonvolatile memory 35 together with the event data and the history data. For example, the identification information may be a model number of the ECU 18, or information indicative of the model or place of destination of the motorcycle 1. Moreover, an accumulated operation time of the motorcycle 1 after shipment from a factory, which is included in the history data, may be used as the identification information.

Operation of Event Data Recorder

Figure 3:
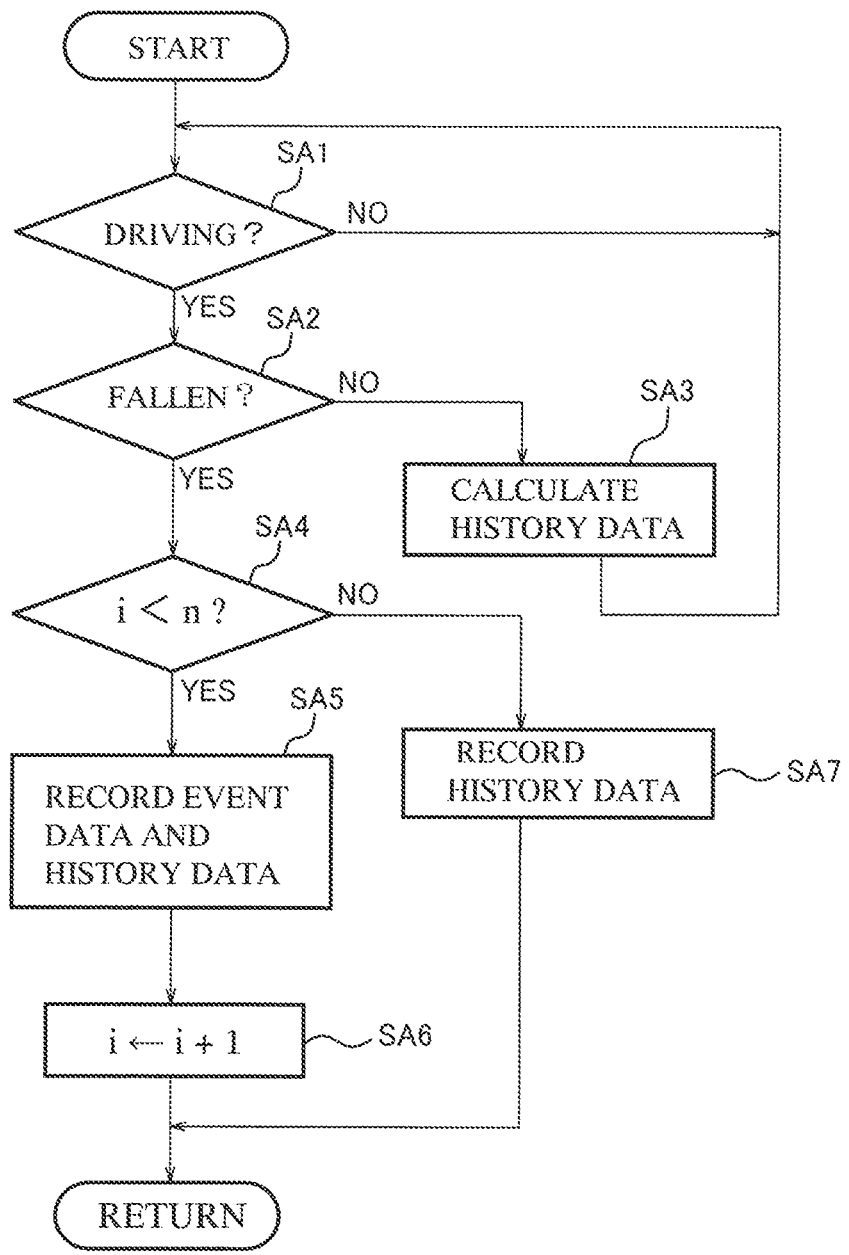
FIG. 3 is a flowchart showing an operation of the EDR of FIG. 2.

Next, the operation of the EDR 20 will be described with reference to the flowchart of FIG. 3. As shown in FIGS. 2 and 3, when the driver turns ON the power supply, the data output control section 32 in the ECU 18 stores in the RAM 34, the data of the output signals from the falling sensor 21, the sensors 22 and the switches 23, and updates the data once in every predetermined time. That is, regarding data which is more than a storage capacity of the RAM 34, the data is sequentially rewritten and preserved, from data corresponding to an oldest data area in the RAM 34. The event data may be updated for every storage of a predetermined data volume instead of once in every predetermined time so long as old data is erased and new data is stored according to a predetermined condition. Then, it is determined whether or not the motorcycle 1 is driving based on, for example, data of the output signal from a speed sensor of the rear wheel 3 (step SA1). If "No" in step SA1, the process returns to step SA1.

On the other hand, if "Yes" in step SA1, the falling determiner section 30 determines whether or not the motorcycle 1 has fallen, based on the output signals from the falling sensor 21 in step SA2. If "No" in step SA2, history data is calculated from the data of the output signals from the sensors 22 and the switches 23 which are preserved in the RAM 34 (step SA3), and is stored in a storage area of the history data in the RAM 34. After that, the process returns to step SA1.

On the other hand, if it is determined that the motorcycle 1 has fallen, the vehicle body continues to be banked to a predetermined angle or greater, and the falling sensor 21 continues to output a signal indicating detection of the fall for a specified period of time, it is determined as "Yes" in step SA2 and then it is determined whether or not the number of times "i" determination as to the fall occurs is less than a preset number "n" (step SA4). If it is determined as "Yes" in step SA4, i.e., the number of times "i" determination as to the fall occurs is less than "n," the data output control section 32 reads out the event data and the history data from the RAM 34 and stores the event data and the history data in the nonvolatile memory 35 such that these data are unable to be rewritten (step SA5). After that, the number of times "i" is incremented in step SA6 (i=i+1). After that, the process returns to step SA1.

On the other hand, if it is determined that the motorcycle 1 has fallen ("Yes" in step SA2), but it is determined that the number of times "i" determination as to the fall occurs is equal to or greater than the preset number "n," ("No" in step SA4) the data output control section 32 does not store the event data in the nonvolatile memory 35. In this case, the data output control section 32 reads out only the history data from the RAM 34 and stores the history data in the nonvolatile memory 35 such that the history data is unable to be rewritten (step SA7). After that, the process returns to step SA1.

Figure 4:
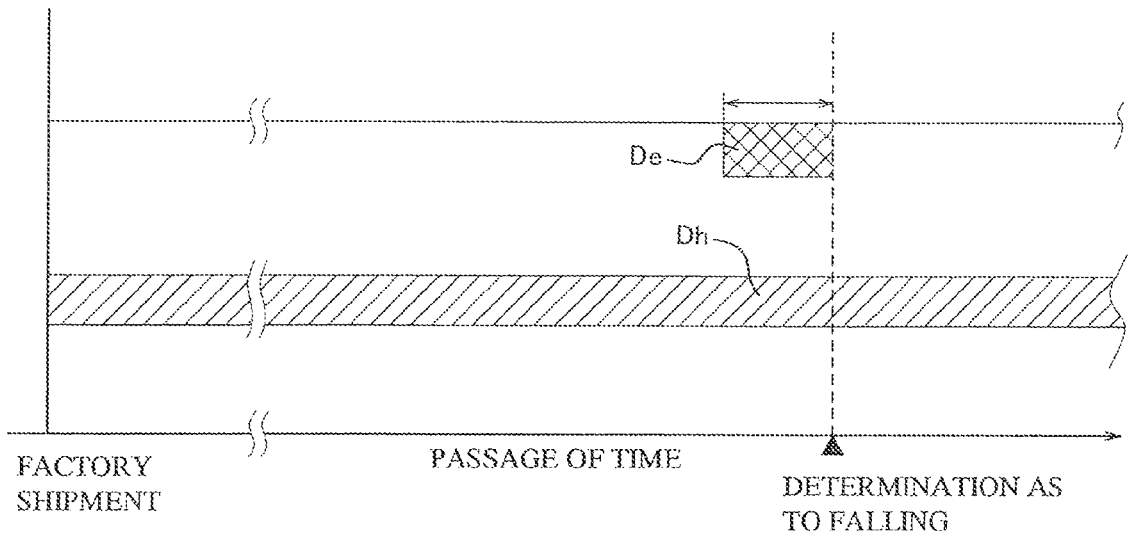
FIG. 4 is a view schematically showing a period during which event data and history data are recorded.

As described above, since the data is unable to be rewritten in the nonvolatile memory 35 and its storage capacity is limited, the number of times the event data having a great volume is restricted to the preset number "n" (e.g., n=3 to 5). As schematically shown in FIG. 4, event data De is data of the output signals from the sensors 22 and the switches 23 during a period of time between a time point when a trigger is received and a time point that is a predetermined time (e.g., 8 seconds) back from the time point when the trigger was received. The event data De is sampled at short time intervals and therefore has a great volume.

By comparison, history data Dh indicates a maximum value of past vehicle speeds (rear wheel speeds), the number of times the power supply is turned ON, etc., and its volume per unit time is much less than that of the event data De. Therefore, the history data Dh can be stored in a small storage area in the nonvolatile memory 35 over a period of time which is longer than 10 years.

In the present embodiment, regarding the event data having a very great volume to represent a state of the fall of the motorcycle 1, the number of times the event data is recorded is restricted so that a storage capacity of the history data after shipment of the motorcycle 1 from the factory until a current time is ensured. Thus, useful information can be stored in a limited storage capacity as much as possible. Note that even after the number of times the event data is recorded exceeds the restricted number of times, the history data continues to be stored, and contains information indicative of the number of times the motorcycle 1 falls.

Event Data

To be specific, the event data may contain at least information relating to the driver's operation of the motorcycle 1. This information may allow the state of the fall to be understood and analyzed more easily. This information may relate to aspects of the driver's operation which are less likely to occur during normal driving, such as an excessively rapid braking operation, a rapid steering operation, or a rapid acceleration operation, and may possibly lead to a fall. Nonetheless, this information does not have to relate to the driver's operation so long as it is effectively utilized to understand and analyze the state of falling.

The event data is recorded in such a manner that information indicative of output values from a plurality of sensors are stored at predetermined time intervals. The time intervals may be made different depending on a magnitude of a change in the information with a passage of time. For example, the time interval at which information changing less with a passage of time is recorded is set longer than the time interval at which information changing more with a passage of time is recorded. Or, the information may be stored at synchronized times so that the information at a particular time can be compared to each other. Or, to understand a change in the output value of the sensor, a plurality of output values from a particular sensor are recorded with a passage of time. For example, when a sampling period is "s", a time period for which the information is recorded is set to s×m (m: natural number) which is back from the time point when the trigger is generated.

As described above, since the data of the output signals of the sensors 22 are all recorded for a period of time between the time point when the trigger is generated and the time point that is back from the time point when the trigger is generated, the state of the fall of the motorcycle 1 can be analyzed more easily. In addition, since the period of time for which the event data is recorded is restricted to the period of time between the time point when the trigger is generated and the time point that is back from the time point when the trigger is generated, it becomes possible to prevent the volume of the event data from increasing undesirably. For example, the event data may be stored in the RAM 34 at sampling periods of 0.1 to 0.5 second and may be updated at time intervals of 10 seconds to correspond to the storage capacity of the RAM 34, to understand the state of the fall of the motorcycle 1 and analyze the cause of the fall.

TABLE 1

Event data

Front wheel speed
Rear wheel speed
Throttle valve opening degree
Transmission gear position
Clutch switch output data
Engine speed
Fuel injection amount
.
.
.
Error flag
.
.
.
Power mode
TRC mode Table 1 shows exemplary event data such as the front wheel speed, the rear wheel speed, the throttle valve opening degree, the transmission gear position, the clutch switch output data, the engine speed, the fuel injection amount, the error flag, and modes of the motorcycle 1. Although not shown in the table 1, the event data may include data of output signals unique to the motorcycle 1, such as the bank angle of the vehicle body output from the gyro sensor, the driver's gripping force of the throttle grip 7 which is output from the grip pressure-sensitive sensor, etc. Based on the bank angles which change at the time of falling, a change of the attitude of the vehicle body at the time of the fall can be analyzed more easily.

More specifically, as the event data, a plurality of driving speeds or a plurality of driving wheels are recorded at predetermined periods for a predetermined period of time that is back from the time point when the trigger was generated, in addition to the engine speed for the predetermined period of time. This makes it possible to analyze a slip state of the driven wheel just before an occurrence of the falling of the motorcycle 1.

Or, as the event data, error flags of sensors and actuators are recorded, which makes it possible to determine whether or not the sensors and the actuators are abnormal just before an occurrence of the falling of the motorcycle 1, and hence analyze whether or not the abnormal states of the sensors and actuators affected the fall. Or, as the event data, activated/deactivated states of engine control modes at the time of the fall are recorded, which makes it possible to analyze whether or not the fall of the motorcycle 1 is associated with the modes. For example, it can be determined whether or not the fall relates to each of the permission/inhibiting states of, for example, a driving power restriction control, a fuel efficiency priority control, a driving power suppressing control in determination as to a slip, or an ABS (anti-lock brake system) control at occurrence of a lock of the front or rear wheel.

Or, as the event data, activated/deactivated states of controls for assisting a driving operation such as a fuel reduction control during deceleration, a driving power suppressing control at occurrence of a slip, and an ABS control at occurrence of a lock of a wheel during braking may be recorded. This makes it possible to analyze whether or not the control state of the ECU just before the fall affected the fall. Moreover, the event data may include information about a bank angle, a steering angle, a brake pressure, an acceleration, and a fuel which change with a passage of time, turn signal operation information, ON/OFF of a head lamp high beam, ON/OFF of a hazard lamp, etc.

History Data

By comparison, the history data includes information relating to a driving/moving state of the motorcycle 1, and indicates, for example, a trend of the driver's driving operation. As can be seen in table 2, illustrated below, the history data may include a maximum value of a vehicle speed (rear wheel speed), the number of times the power supply is turned ON after shipment from the factory until a n-th trigger is generated in the EDR 20, the number of times the power supply is turned ON from when the n-th trigger is generated in the EDR 20 until it is read out, an accumulated time of TRC (traction control), a distribution of the vehicle speed, a distribution of the throttle valve opening degree, the number of times the engine E stalls, the number of times a fall (including falling which occurs when the motorcycle which is in a stopped state or is going to be stopped cannot be supported on the ground) occurs. This information represents a user's normal use state of the motorcycle 1 and can be used to analyze a cause of the falling of the motorcycle 1 together with the event data.

TABLE 2

History data

Maximum value of vehicle speed (rear wheel speed)
The number of times power supply is turned ON
(before n-th fall occurs)
The number of times power supply is turned ON
(after n-th fall occurs until it is read out)
.
.
.
Accumulated time of TRC control
.
.
.
Distribution of a vehicle speed
Distribution of a throttle valve opening degree
.
.
.

TABLE 2-continued

History data

The number of times engine stalls
The number of times falls occur
.
.
.

Or, the history data may include a maximum value of a vehicle moving speed, a moving speed distribution (moving speeds measured after shipment from all factories are accumulated for each speed range, and an accumulated moving speed is indicated for each speed range), an accumulated value of the number of times falls occur, etc. The history data is processed such that its volume is reduced using accumulated values and extreme values of the output signals of the sensors 22, before they are recorded. In this way, the volume of data can be reduced as compared to a case where all of the output signals from the sensors 22 are stored without any processing, even when the data is sampled for a long period of time.

As the history data, the number of times the power of the motorcycle 1 is turned ON, which is accumulated after shipment of the factory, a period during which the power supply is ON, which is accumulated after shipment of the factory, the number of times the power supply is turned ON, which is accumulated after shipment from the factory until the n-th trigger is generated in the EDR 20, and a period during which the power supply is ON, which is accumulated after shipment from the factory until the n-th trigger is generated in the EDR 20, are recorded. This makes it possible to analyze a trend of the driver's operation leading to the occurrences of falling.

Or, as the history data, the distribution of the driving/moving speed of the motorcycle 1, the distribution of the throttle valve opening degree, the maximum vehicle speed, etc., are recorded. This makes it possible to determine a trend of the driver's driving operation and analyze a cause of the fall using the event data. Or, the trend of the driver's driving operation can be determined in the same manner based on recorded information about the number of times an engine stop control occurs when determination as to the fall is made, an accumulated execution time (accumulated execution time of TRC) for which a driving power suppressing control is executed when determination as to the slip is made, etc.

Or, the history data may include accumulated values, extreme values and average values of the output signals of the sensors 22, such as the number of times the engine E is stopped, the number of times the driving power suppressing control occurs when determination as to the slip is made (the number of times the TRC occurs), the number of the ABS control occurs, an accumulated execution period of the ABS control, a maximum value of the brake pressure, the number of times the error flag occurs, an accumulated period for which the error flag occurs, the number of times a reserve tank is used, the number of times a battery is fully discharged, a maximum value of a change rate of the throttle valve opening degree with a passage of time, a maximum value of a change rate of the brake pressure with a passage of time, and a maximum bank angle.

Although the processed values (accumulated value, extreme value and average value) of raw data are used as the history data in the present embodiment, to compress a data volume, the data volume may be compressed by another method. For example, the history data may be sampled at intervals greater than those at which the event data is sampled.

Figure 5:
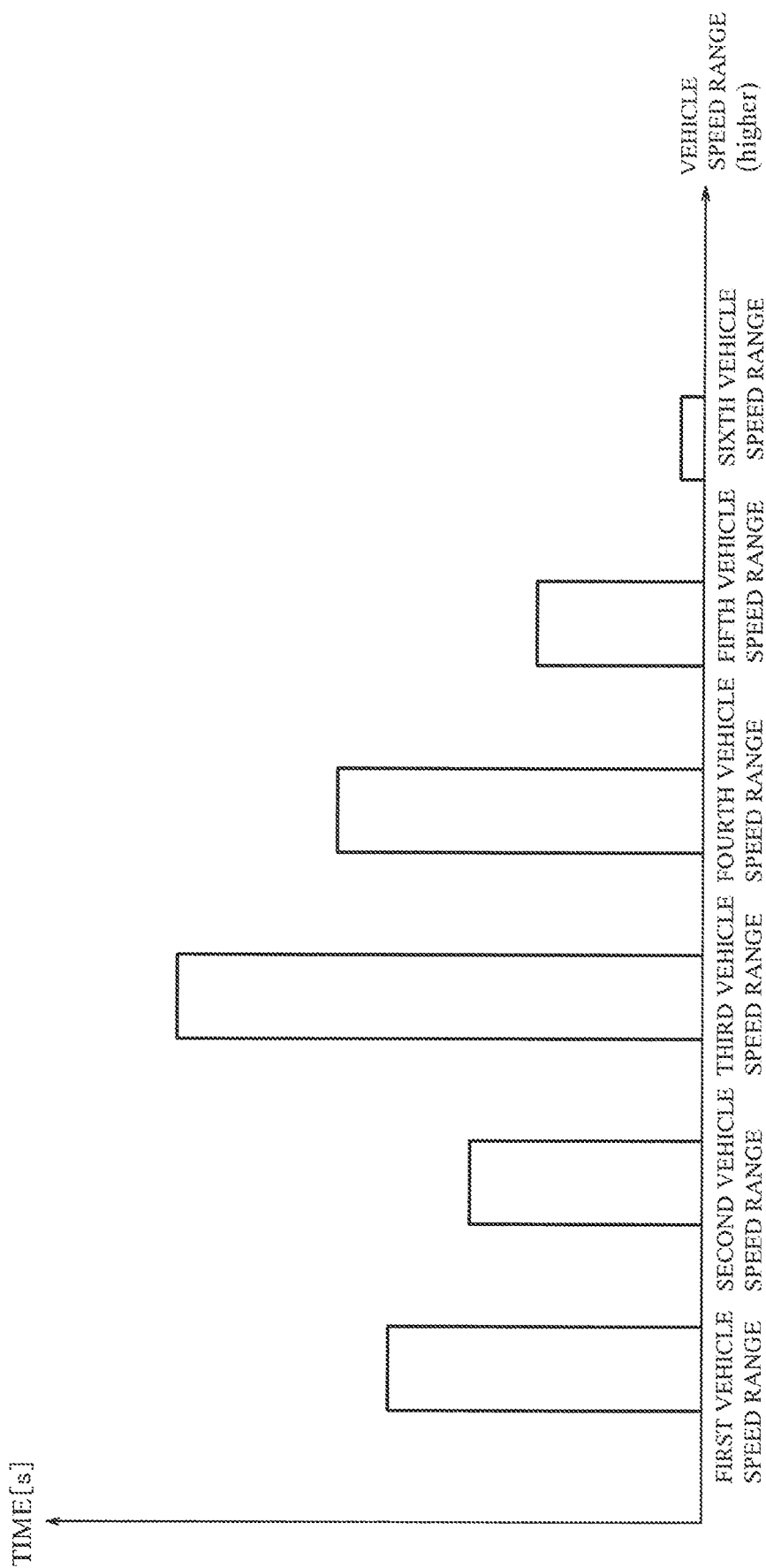
FIG. 5 is a view showing a distribution of vehicle speed ranges included in the history data.

As examples of the history data, FIG. 5 shows the distribution of the driving/moving speed of the motorcycle 1, i.e., the distribution of the vehicle speed ranges. The distribution is created in such a manner that data of vehicle speed is accumulated from a time point when the motorcycle 1 was new until now, and preserved as accumulated use times corresponding to first vehicle speed range to sixth speed range, respectively. As can be seen from FIG. 5, a range in which the motorcycle 1 drives with a highest frequency is the third vehicle speed range, and a range in which the motorcycle 1 drives with a second highest frequency is the fourth vehicle speed range. A driving time corresponding to the first speed range, including idling is relatively longer. From this, it is presumed that the user drives more frequently in a town, and does not frequently drive at a higher speed.

In accordance with the EDR 20 configured as described above, for example, the fall of the motorcycle 1 triggers recording of the event data and the history data, and the state of the fall can be understood and analyzed, based on information contained in these data. Instead of determination as to the falling of the motorcycle 1 based on the output signal from the falling sensor 21 like the present embodiment, a collision or the like of the motorcycle 1 may be determined based on the output signals from sensors other than the falling sensor 21, for example, the acceleration sensor and the tire pneumatic sensor of the front wheel 2, and based on these output signals, the data may be recorded.

Or, it may be determined that the driver is thrown off from the motorcycle 1 at the fall if the driver is away from the motorcycle 1 during driving based on the output signals from the grip pressure-sensitive sensor attached on each of the right and left grips of the steering handle 6 of the motorcycle 1, a seating sensor attached on the seat 14, etc., and based on these output signals, the data may be recorded.

Data Reading System

Figure 6:
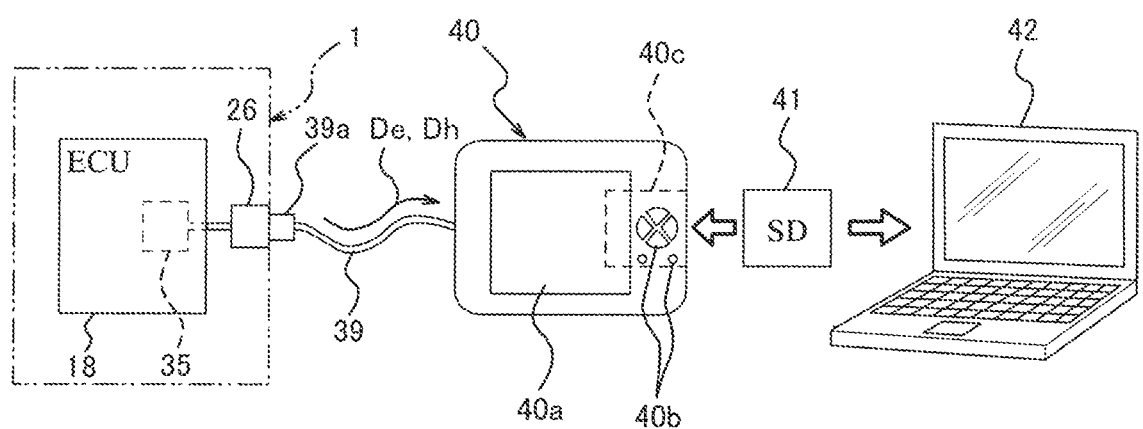
FIG. 6 is a view showing a configuration of a system for obtaining the event data and the history data.

FIG. 6 shows a system for obtaining the history data and the event data from the EDR 20 configured as described above. FIG. 6 schematically shows a case where a portable reader device 40 is coupled to the ECU 18 of the motorcycle 1 via a communication line 39, and the event data and the history data are read out from the nonvolatile memory 35 in the ECU 18. As an example of the portable reader device 40, there may be used an existing diagnostic tablet which includes a microcomputer, memory, an I/O, etc., and is coupled to the ECU 18 via a diagnostic connector 26 such that the data is transmitted to/received from the ECU 18. In the present embodiment, a special program is installed in the diagnostic tablet to communicate with the data output control section 32 in the ECU 18, read out the data from the nonvolatile memory 35, encrypt the data, and store the data in its internal memory.

The above stated diagnostic tablet is fundamentally intended to read out the program, the data or the like stored in the ECU 18, and therefore can read out information other than the event data and the history data. The information other than the event data and the history data need not be encrypted but may be displayed on or modified in the portable reader device 40. For example, an engine control program set for normal driving may be changed into an engine control program for driving on a circuit. Or, the ECU 18 may be configured such that an ECU program is changed by the driver or a maintenance person, or data stored in the ECU 18 is read out.

The portable reader device 40 is configured by utilizing the existing diagnostic tablet, and the event data and the history data can be read out via the diagnostic connector 26 attached on the ECU 18 to diagnose the system. Therefore, the number of components can be reduced without providing a dedicated interface.

In the present embodiment, a display 40*a* and a switch 40*b* are provided on the front surface of the portable reader device 40. By coupling a connector 39*a* of the communication line 39 to the diagnostic connector 26 of the ECU 18 and performing a predetermined operation, the event data and the history data can be read out from the nonvolatile memory 35 in the ECU 18. The read data is encrypted by, for example, a known encryption scheme such as AES (Advanced Encryption Standard), and the encrypted data is preserved as an encrypted data file. Since a decryption program is not installed in the portable reader device 40, the contents of the event data or the like cannot be displayed on the portable reader device 40. The encryption scheme is not limited to the AES, but may be any of general schemes.

The portable reader device 40 of FIG. 6 is provided with an external storage medium attaching section 40*c* such as an SD card reader/writer, which allows the encrypted data file to be written to an external storage medium 41 such as an SD (secure digital) card memory and preserved therein. As the external storage medium 41, a USB memory, a CD, a DVD, a microchip, or the like may be used so long as data can be stored therein in a nonvolatile manner. Preferably, the data is stored in the external storage medium 41 such that it is unable to be rewritten. By using a versatile storage medium, an inexpensive reader device and an inexpensive external storage medium are attained. To read out the event data and the history data, the reader device may have a dedicated structure different from structures of general reader devices. This can limit a device which is able to read the data, and hence prevent the data from being rewritten.

The portable reader device 40 is not built into the motorcycle 1. For example, only employees in delivery agents (distribution outlets) of the motorcycle 1 and employees in service sites are permitted to carry and use the portable reader device 40. In particular facilities such as some of the service deposits and development deposits of manufacturers of the motorcycle 1, an analyzing device 42 constituted by a computer separate from the portable reader device 40 is prepared. For example, the analyzing device 42 may be configured by installing a decryption program having an encryption key in a general personal computer. By providing the encrypted data file to the analyzing device 42 via the external storage medium 41 and decrypting the encrypted data file into the event data and the history data, the state of the fall can be understood and analyzed based on the event data and the history data.

Operation of Data Reading System

Figure 7:
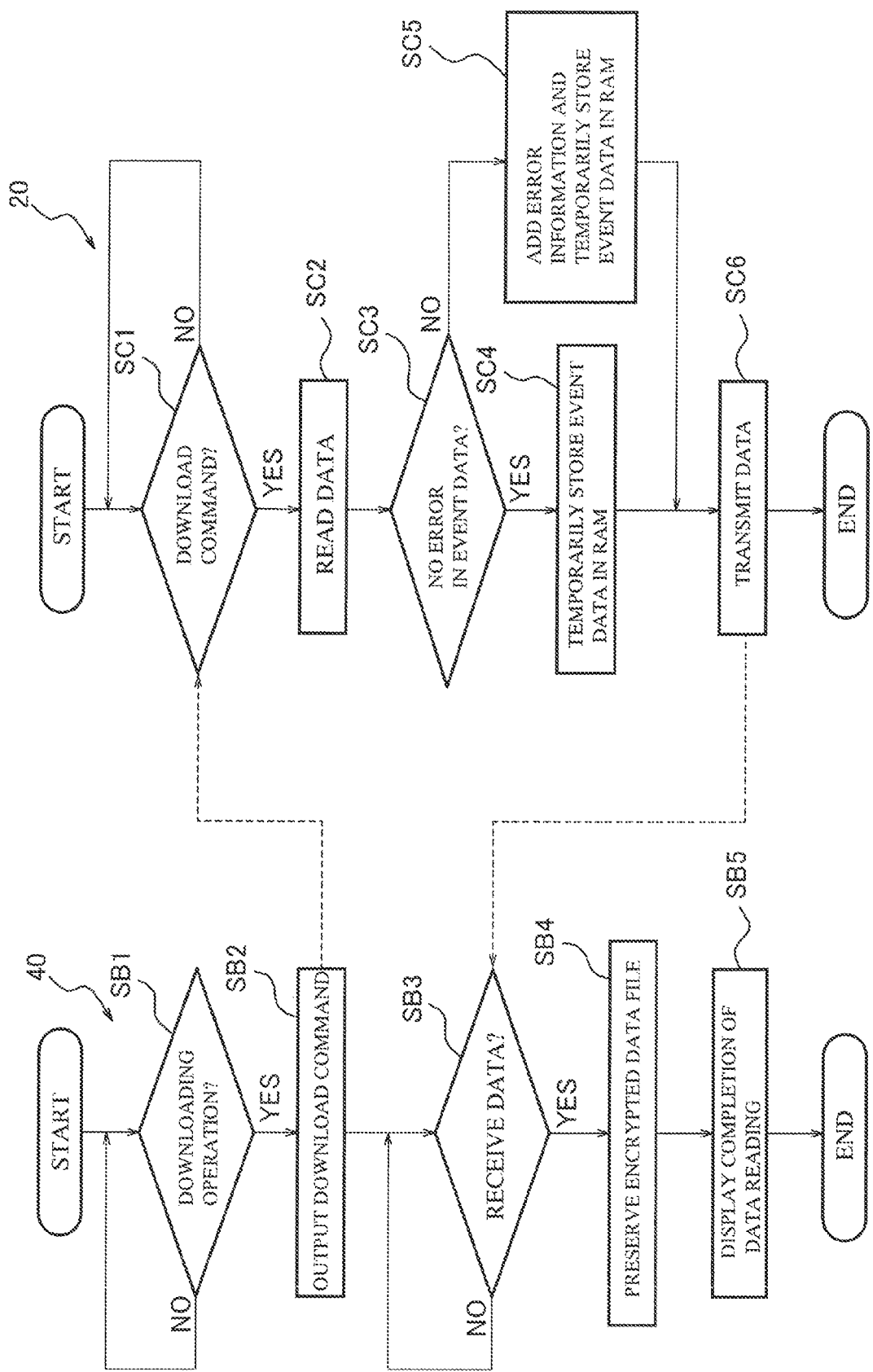
FIG. 7 is a flowchart showing operation of the data obtaining system of FIG. 6.

Next, a procedure for obtaining the data from the EDR 20 will be specifically described with reference to the flowchart of FIG. 7. Carrying the portable reader device 40, the employee in the delivery agent of the motorcycle 1, etc., goes to a place where the motorcycle 1 is placed, for example, a place where the fall of the motorcycle 1 occurred, the user's home, or a delivery agent to which the user brought the motorcycle 1 for repair. Even in a case where the motorcycle 1 cannot drive for itself, the data is preserved in the nonvolatile memory 35 in the ECU 18.

Then, the employee couples the connector 39*a* of the communication line 39 of the portable reader device 40 to the diagnostic connector 26 of the ECU 18, and turns ON the power supply of the motorcycle 1 and the power supply of the portable reader device 40. Then, the employee performs a predetermined downloading operation by operating the switch 40*b* of the portable reader device 40, etc. Thereupon, it is determined as "Yes" in step SB1 in the flow of FIG. 7, and a download command is output to the EDR 20, to be precise, the ECU 18, via the communication line 39 (step SB2).

In response to the download command, the data output control section 32 in the ECU 18 determines that the download command has been received ("Yes" in step C1). The data output control section 32 reads out the event data and the history data from the nonvolatile memory 35 (step SC2). At this time, the data output control section 132 compares the two event data read out from two storage areas of the nonvolatile memory 35 and determines whether or not these two event data to be mirrored match, i.e., there is no error in these two event data (step SC3).

If it is determined as "Yes" in step SC3, the history data and the event data are temporarily stored in the RAM 34 (step SC4). If it is determined that these two event data do not match ("No" in step SC3), the event data having been written to the nonvolatile memory 35 at an earlier time is added with error information, and temporarily stored in the RAM 34 together with the history data (step SC5). Then, the data output control section 132 causes the history data and the event data which are temporarily stored in the RAM 34 to be transmitted to the portable reader device 40 via the communication line 39 (step SC6).

The portable reader device 40 is in a stand-by state before it receives the above stated data ("No" in step SB3). Receiving the data, it is determined as "Yes" in step SB3, and the portable reader device 40 encrypts the received data and stores the encrypted data in the internal memory thereof. That is, the encrypted data file is written to the internal memory of the portable reader device 40. And, the encrypted data file is also written to and preserved in the external storage medium 41 (step SB4). Alternatively, the encrypted data file may be written only to the internal memory of the portable reader device 40 and may be written to the external storage medium 41 when an operation is performed by the user.

When preservation of the encrypted data file is completed, for example, a message stating "data reading is completed" is displayed on the display 40*a* of the portable reader device 40 (step SB5). Then, the external storage medium 41 is detached from the external storage medium attaching section 40*c* of the portable reader device 40 and transported to a facility in which the analyzing device 42 is present. The employee in the delivery agent or the like carrying the portable reader device 40 may bring the external storage medium 41 to the facility or send it by mail. Receiving the external storage medium 41, an analyzer in the facility attaches it to the analyzing device 42 and decrypts the encrypted data file into the event data and the history data. Based on the event data and the history data, the analyzer can understand and analyze the state of the fall of the motorcycle 1, or the like.

As described above, in the data reading system of the present embodiment, the EDR 20 is configured by utilizing the processor function of the ECU 18 for controlling the operation of the motorcycle 1, and stores in the nonvolatile memory 35, the event data indicating the state of the fall or the like and the history data (vehicle information) indicating the normal use state, etc. The employee in the delivery agent or the like can read out the data from the nonvolatile memory 35 using the portable reader device 40, encrypt the data, and preserve the encrypted data in the external storage medium 41, or the like.

Therefore, the event data and the history data can be easily attained via the external storage medium 41 without a need to transport the motorcycle 1 which has fallen to a particular facility. The event data and the history data allow the analyzing device 42 to analyze the state of the fall or the like. Not only the event data indicating the state of the fall or the like but also the history data indicating the normal use state of the user can be attained. Therefore, analysis can be performed with higher accuracy by using the event data and the history data in combination.

In addition, the portable read device 40 preserves the downloaded event data and the like in the form of the encrypted data file and does not have a function for decrypting the encrypted data file. That is, the portable read device 40 is unable to display or change the contents of the data. Therefore, there is no fear that the event data and the like will be rewritten inadvertently or a portion of the event data and the like will be missing, before the analyzing device 42 decrypts (decodes) the encrypted data file. Thus, the credibility of the data is very high.

In the present embodiment, the nonvolatile memory 35 which is not rewritable, such as EPROM, is removably mounted onto the circuit board of the ECU 18. Thus, the nonvolatile memory 35 is adequately protected from a shock, heat, an electric noise, and others. In addition, since the ECU 18 is positioned in an anti-theft location to prevent it from being replaced unwantedly, it is possible to prevent the nonvolatile memory 35 from failing to operate or being detached unexpectedly. And, the event data and the like will not be changed or rewritten in the nonvolatile memory 35 built into the motorcycle 1. Thus, credibility of the data is high. Furthermore, it is possible to prevent the engine E from running in a state in which the nonvolatile memory 35 is removed from the ECU 18 so that the information about the fall is not stored intentionally. Moreover, the mirroring of the event data can improve credibility of the event data more effectively. Note that the nonvolatile memory 35 may be removably mounted to a socket of a board of the ECU 18.

Since the event data and the history data are read out via the portable reader device 40 which is not built into the vehicle (motorcycle 1) as described above, it is not necessary to mount an information reader device into the vehicle. This can prevent an increase in the number of components in the vehicle, and allows for utilization of a space corresponding to the portable reader device 40. This results in an advantage to a straddle-type vehicle having a smaller vehicle body. In general, any measures must be taken to allow a reader device incorporated into a vehicle to have resistances to a vibration, water, heat, an electromagnetic noise, and others. By using the portable reader device 40 which is separate from the vehicle like the present embodiment, the configuration of the portable reader device 40 can be simplified and its cost can be reduced, as compared to a case where the reader device is built into the vehicle.

Since the EDR 20 is configured by utilizing the processor function of the ECU 18 for controlling the operation of the motorcycle 1, in the present embodiment, space saving and cost reduction can be achieved. In addition, since the existing diagnostic tablet is utilized as hardware of the portable reader device 40 and the dedicated program is installed in the diagnostic tablet, the portable reader device 40 can be implemented at relatively lower cost. Since only the employee in the delivery agent or the like is permitted to carry and use the portable reader device 40, credibility of the event data and the like can be further improved.

Embodiment 2

Next, Embodiment 2 will be described. In Embodiment 2, an EDR 120 (ECU 118) is configured in such a manner that a trigger generating section 131 sends a trigger to a data output control section 132 if it is determined that the motorcycle 1 has fallen and a rear wheel speed is equal to or greater than a predetermined value. The other configuration is identical to that of Embodiment 1 and the same components are identified by the same reference symbols and will not be described in repetition.

Event Data Recorder

Figure 8:
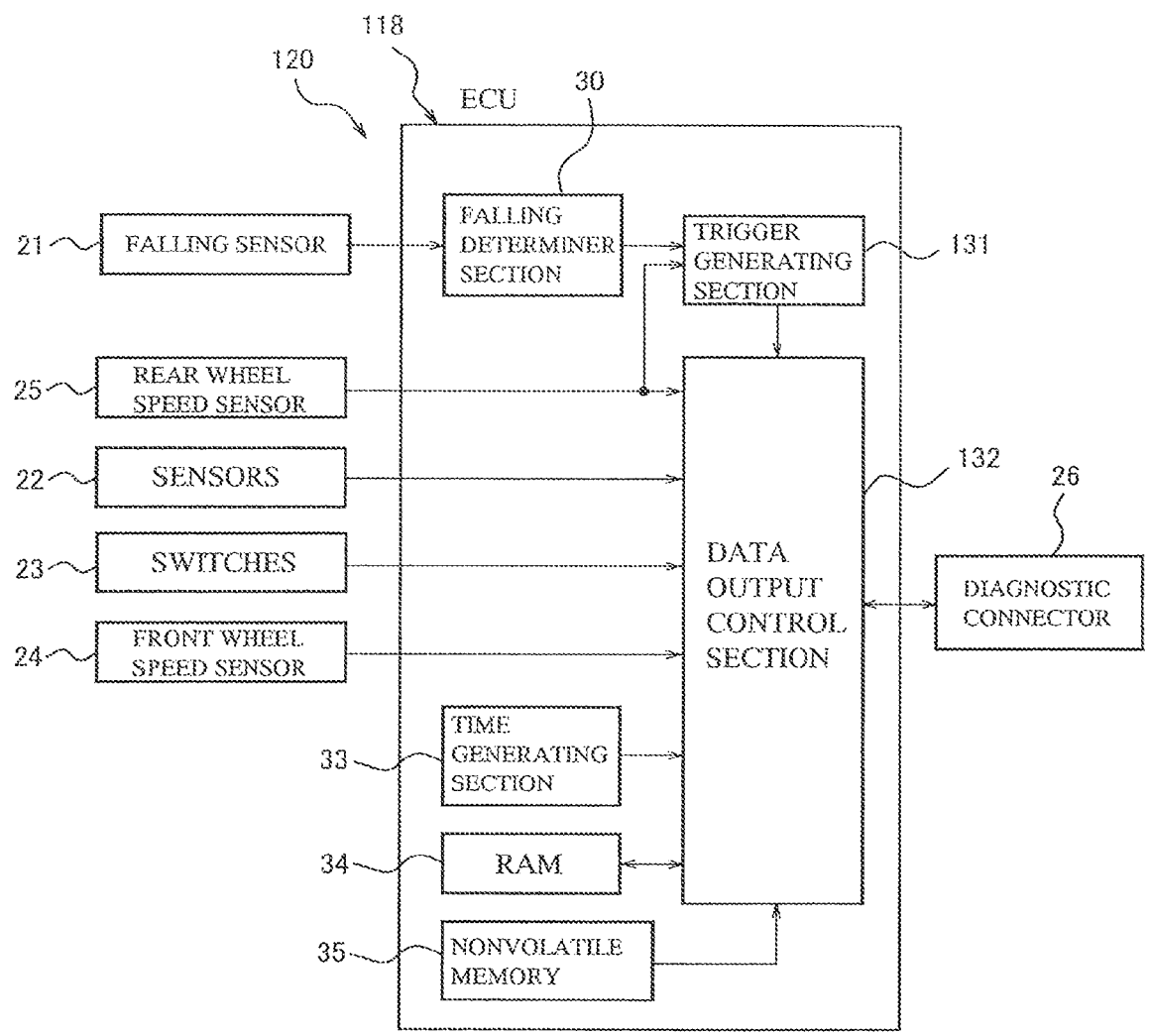
FIG. 8 is a block diagram showing an EDR according to Embodiment 2 of the present invention.

FIG. 8 is a block diagram showing the EDR 120 according to Embodiment 2 of the present invention. Like the EDR 20 of Embodiment 1, the EDR 120 is configured by utilizing a processor function of the ECU 118. The ECU 118 is coupled with the falling sensor 21, the sensors 22 (devices), the switches 23 (devices), a front wheel speed sensor 24 (device) for detecting a front wheel speed from a rotational speed of the front wheel 2, and a rear wheel speed sensor 25 (device) for detecting a rear wheel speed from a rotational speed of the rear wheel 3. Specific examples of the sensors 22 and the switches 23 have been already described in Embodiment 1.

As in Embodiment 1, the ECU 118 is configured to receive the output signals from the falling sensor 21, the sensors 22, the switches 23, the front wheel speed sensor 24 and the rear wheel speed sensor 25, and control the operation of the engine E, or the like, based on the received signals. In addition, the ECU 118 operates as the EDR 120 which stores the data of the output signals from the above sensors, etc., such that they are updated once in every predetermined period and records particular data in at least a predetermined period just before the fall of the motorcycle 1 such that the particular data is unable to be rewritten, if it is determined that the motorcycle 1 has fallen.

The EDR 120 is also configured in such a manner that a data output control section 132 in the ECU 118 causes the data of the output signals from the vehicle speed sensors 24, 25 to be stored as time-series data in the RAM 34 and update the data once in every predetermined period while the power supply of the motorcycle 1 is ON. The data output control section 132 in the ECU 118 causes particular data indicating at least a moving state in a normal use state of the motorcycle 1 to be stored as history data in the nonvolatile memory 35. Furthermore, the data output control section 132 in the ECU 118 causes particular data relating to a fall of the motorcycle 1 to be stored as event data in the nonvolatile memory 35, if it is determined that the motorcycle 1 has fallen.

More specifically, the ECU 118 includes the falling determiner section 30, the trigger generating section 131, the data output control section 132 and the time generating section 33. The falling determiner section 30 is configured to determine whether or not the motorcycle 1 has fallen and is in a down position based on the output signal from the falling sensor 21. The falling sensor 21 and the falling determiner section 30 constitute a determiner system. The trigger generating section 131 is configured to send a trigger to the data output control section 132 if a vehicle speed of the rear wheel 3 (driving wheel) of the motorcycle 1 which is detected by the rear wheel speed sensor 25 is equal to or greater than a predetermined value, when the falling determiner section 30 determines that the motorcycle 1 has fallen. That is, in the present embodiment, the rear wheel speed sensor 25 and the trigger generating section 131 constitute a detecting system.

Receiving the trigger from the trigger generating section 131, the data output control section 132 reads out the event data from the RAM 34 and stores the read event data in the nonvolatile memory 35 such that the event data is unable to be rewritten. That is, the data output control section 132 operates as a controller which initiates storing of the event data in the nonvolatile memory 35 if it is determined that the motorcycle 1 has fallen, and if it is detected that the rear wheel speed is equal to or greater than the predetermined value.

Operation of Event Data Recorder

The EDR 120 operates along the flowchart of FIG. 3. When the driver turns ON the power supply, the data output control section 132 in the ECU 118 stores the data of the output signals from the falling sensor 21, the sensors 22, the switches 23, the front wheel speed sensor 24 and the rear wheel speed sensor 25, and updates these data once in every predetermined period in the RAM 34. That is, regarding data which is more than the available storage capacity of the RAM 34, the data is sequentially rewritten and preserved, from data corresponding to an oldest data area in the RAM 34. The event data may be updated in the RAM 34 for every storage of a predetermined data volume instead of once in every predetermined time so long as old data is erased and new data is stored according to a predetermined condition.

Then, it is determined whether or not the motorcycle 1 is driving based on the output signal from the rear wheel speed sensor 25 (SA1). If the rear wheel speed is less than a predetermined value (e.g., 10 km/h) and therefore it is determined as "No" in step SA1, the process returns to step SA1. On the other hand, if the rear wheel speed is equal to or greater than the predetermined value and if it is determined as "Yes" in step SA1, the falling determiner section 30 determines whether or not the motorcycle 1 has fallen, based on the output signal from the falling sensor 21 in step SA2.

If it is determined as "No" in step SA2, history data is calculated from the data of the output signals of the sensors 22 and the switches 23 which are preserved in the RAM 34 (step SA3), and is stored in a storage area of the history data in the RAM 34, and the process returns to step SA1. Of course, the predetermined value of the rear wheel speed which is a trigger condition for the operation of the EDR 120 may be a value other than 10 km/h. Or, the predetermined value of the rear wheel speed which is the trigger condition may be changed based on a driving state of the motorcycle 1 such as the vehicle speed, a transmission gear ratio, or a driving mode. Thus, the EDR 120 can operate with higher accuracy.

On the other hand, if it is determined that the motorcycle 1 has fallen, the vehicle body continues to be banked to a predetermined angle or greater, and the falling sensor 21 continues to output a signal indicating detection of the fall for a specified period of time, it is determined as "Yes" in step SA2 and then the trigger generating section 131 sends the trigger to the data output control section 132. After that, the process goes to step SA4, and the operation occurs as in Embodiment 1.

The EDR 120 of the present embodiment is activated if the rear wheel speed is higher when the motorcycle 1 has fallen. The EDR 120 stores the event data and the history data in the nonvolatile memory 35 in the ECU 118. Since the fall of the motorcycle 1 triggers the recording operation of the EDR 120, an incorrect operation of the EDR 120 which would be caused by a shock can be suppressed. Even in a case where the motorcycle 1 falls during driving, a case where the rear wheel 3 spins and the motorcycle 3 falls on a sandy road or a swampy place, or a case where the driving speed decreases due to a collision and then the motorcycle 1 falls, the EDR 120 may be activated to record the event data and the history data if the rear wheel speed is higher than the predetermined speed. On the other hand, in a case where the motorcycle 1 which is in a stopped state or is going to be stopped cannot be supported on the ground, the rear wheel speed is low. In this case, unnecessary data will not be recorded. Thus, the EDR 120 can operate with higher accuracy.

Since the EDR 120 is activated based on the rear wheel speed, the rear wheel speed sensor 25 is necessary. In general, the motorcycle 1 includes the rear wheel speed sensor 25. Therefore, there is no need for an additional sensor, which will not increase cost. Since the ECU 118 has the EDR function (program), the number of components and an installation space can be reduced, which is suitable for a straddle-type vehicle such as the motorcycle 1 having a limited space.

The event data and the like stored in the nonvolatile memory 35 in the ECU 118 can be downloaded by connecting a personal computer or the like to the diagnostic connector 26 in the ECU 118. Based on information contained in the event data and the like, the state of the fall can be understood and analyzed. Therefore, the analysis can be performed with higher accuracy by using in combination, the event data and the history data stored in the nonvolatile memory 35.

Instead of a determination as to the falling state of the motorcycle 1 based on the bank angle of the vehicle body detected by the falling sensor 21, as in the present embodiment, it may be estimated that the motorcycle is going to fall after a change in the bank angle of the vehicle body per unit time exceeds a predetermined range, i.e., the attitude of the motorcycle 1 changes rapidly to a greater extent, the trigger generating section 131 may send a trigger if the rear wheel speed is higher, and the data output control section 132 may initiate recording of the event data and the like. The determination as to the falling of the motorcycle 1 (including the above stated rapid change in the attitude of the motorcycle 1) may be performed using the bank angle sensor, the gyro sensor, a contact sensor, etc., instead of the falling sensor 21.

Or, a steering angle sensor for detecting a rotational angle of the front wheel 2 which is generated by steering the steering handle 6 may be incorporated in the motorcycle 1. Based on an output signal from the steering angle sensor, it may be determined whether the motorcycle 1 is moving straight ahead or turning, and a condition (bank angle, predetermined time, a bank angle change amount per unit time, etc.) used to determine the fall may be made different between the case where the motorcycle 1 is moving straight ahead and the case where the motorcycle 1 is turning. For example, the bank angle used to determine that the motorcycle 1 has fallen may be set smaller for the case where the motorcycle 1 is moving straight ahead than for the case where the motorcycle 1 is turning. Or, the bank angle used to determine that the motorcycle 1 has fallen may be changed based on a driving speed or a turning radius of the motorcycle 1. For example, the bank angle used to determine that the motorcycle 1 has fallen may be set greater for a case where the driving speed is higher. That is, a bank angle with which the motorcycle 1 is going to fall under a state in which the vehicle body is applied with a centrifugal force during turning may be set as the bank angle used to determine that the motorcycle 1 has fallen.

Although in the flow of FIG. 3, it is determined that the rear wheel speed is equal to or greater than the predetermined value and the motorcycle 1 is driving ("Yes" in SA1), and then it is determined whether or not the motorcycle 1 has fallen based on the output signal from the falling sensor 21. The order may be reversed.

The determination as to the fall of the motorcycle 1 may be performed based on a rotational speed of a drive system connected to the driving wheel, instead of the rotational speed of the driving wheel. For example, in a case where the motorcycle 1 includes a clutch which is disengaged to inhibit the driving power from the driving power source from being transmitted to the driving wheel, a rotational speed of a rotary member positioned downstream of the clutch in a driving power transmission direction is preferably used as the condition used to generate a trigger. For example, a rotational speed of an output shaft of the transmission which is located downstream in the driving power transmission direction may be used.

Embodiment 3

Next, Embodiment 3 will be described. The event data recorder 120 is activated when a slip ratio of the front wheel 2 or the rear wheel 3 of the motorcycle 1 increases to a value equal to or greater than a predetermined value and it is determined (estimated) that the motorcycle 1 is more likely to fall. The other configuration is identical to that of Embodiment 2 and the same components are identified by the same reference symbols and will not be described in repetition.

Although not shown, in the event data recorder 120 incorporated into the motorcycle 1 of Embodiment 3, the front wheel speed sensor 24 and the rear wheel speed sensor 25 are coupled to the falling determiner section 30 in the ECU 118. The falling determiner section 30 in the ECU 118 is configured to determine (estimate) that the front wheel 2 or the rear wheel 3 is locked or spinning and therefore the motorcycle 1 is going to fall, when a difference between the front wheel speed detected by the front wheel speed sensor 24 and the rear wheel speed detected by the rear wheel speed sensor 25 is equal to or greater than a predetermined value.

When the falling determiner section 30 determines that the motorcycle 1 has fallen, the trigger generating section 131 sends a trigger to the data output control section 132 if the rear wheel speed detected by the rear wheel speed sensor 25 is equal to or higher than a predetermined value (e.g., 10 km/h).

In accordance with the above configuration, when the motorcycle 1 is more likely to fall and the rear wheel speed is higher, the EDR 120 is activated to store the event data and the history data in the nonvolatile memory 35 in the ECU 118. Since the EDR 120 can be activated at a timing that is a little earlier than a timing at which determination as to the fall is performed based on the output signal of the falling sensor 21 like Embodiment 2, the data can be recorded before the system becomes electrically unstable, due to a shock generated when the motorcycle 1 falls.

Instead of determination (estimation) as to the fall of the motorcycle 1 based on the difference between the front wheel speed and the rear wheel speed, it may be determined (estimated) that the motorcycle 1 has fallen, if an output signal of the acceleration sensor continues to be equal to or greater than a predetermined value for a predetermined time or longer. Of course, in the motorcycle 1 including the acceleration sensor, the EDR 120 may be activated if a great acceleration due to a collision of the motorcycle 1 is detected.

Or, the determination as to the fall of the motorcycle 1 may be performed based on the output signal of the falling sensor 21, like Embodiment 2, and the EDR 120 may be activated based on this determination or the estimation based on the vehicle speed difference or the magnitude of the acceleration.

Embodiment 4

Next, Embodiment 4 will be described. The event data recorder 120 of Embodiment 4 is activated when the driver is away from the motorcycle 1 during driving of the motorcycle 1 and thereby it is determined that the driver has been thrown off the motorcycle 1 due to falling. The other configuration is identical to that of Embodiment 2 and the same components are identified by the same reference symbols and will not be described in repetition.

Although not shown, the EDR 120 includes a seat pressure-sensitive sensor for detecting a pressure generated by the weight of the driver straddling the seat 14 (FIG. 1), and a grip pressure-sensitive sensor for detecting a pressure with which the driver grips the right or left grip of the handle 6 (FIG. 1). The seat pressure-sensitive sensor and the grip pressure-sensitive sensor are coupled to the falling determiner section 30 in the ECU 118. In addition, the rear wheel speed sensor 25 is coupled to the falling determiner section 30 in the ECU 118.

If the output signal from the seat pressure-sensitive sensor is equal to or less than a predetermined value (load applied to the seat 14 is equal to or less than a predetermined value), the output signal from the grip pressure-sensitive sensor is equal to or less than a predetermined value (load applied to the grip of the steering handle 6 is equal to or less than a predetermined value), and the rear wheel speed detected by the rear wheel speed sensor 25 is equal to or higher than a predetermined value (e.g., 10 km/h), the falling determiner section 30 determines that the motorcycle 1 has fallen and the driver has been thrown off from the motorcycle 1. Then, the trigger generating section 131 sends a trigger to the data output control section 132.

In accordance with the above configuration, like Embodiment 2 or 3, the EDR 120 is activated to store the event data and the history data in the nonvolatile memory 35 in the ECU 118 when the motorcycle 1 has fallen. Instead of using the seat pressure-sensitive sensor and the grip pressure-sensitive sensor, for example, in a motorcycle including an electronic key system, it may be determined that the driver has been thrown off from the motorcycle 1 in the above described manner based on an output signal from an electric key ECU and the output signal from the rear wheel speed sensor 25.

As should be known, the electronic key system is unlocked automatically to enable the engine to start when the user carrying the electronic key approaches the motorcycle 1, and disenable the engine to start when the user moves away from the motorcycle 1.

Or, the motorcycle 1 may be provided with a body fastener member (not shown) such as an arm band, which is fastened to the body of the driver, and it may be determined that the driver has been thrown off from the motorcycle 1 based on a signal output from a switch for detecting a state of the fastener member and the output signal from the rear wheel speed sensor 25.

Other Embodiments

The above embodiments are merely exemplary, and are in no way intended to limit the present invention. The embodiments can be improved, changed or modified within a scope of the invention. For example, although in the above embodiments, the EDR 20 is configured to be integral with the ECU 18 of the motorcycle 1, an EDR may be separated from the ECU 18 by additionally providing a processor circuit, or the like.

Although the EDR 20 of the above embodiments initiates the recording operation of the data in response to the determination as to the falling of the motorcycle 1, i.e., the determination as to the falling triggers the EDR 20's recording operation of the data, the trigger may be generated based on other information such as determination as to an acceleration. A general method may be used as a trigger for initiating the recording operation of the EDR 20.

Although the nonvolatile memory 35 in the EDR 20 in the above embodiments is constituted by unrewritable semiconductor memory, a rewritable semiconductor memory may be used as the nonvolatile memory 35. In that case, the output data control section 32 in the ECU 18 stores the event data and the history data in the nonvolatile memory 35 such that these data are unable to be rewritten.

Although in the above embodiments, the portable reader device 40 is provided with the external storage medium attaching section 40c, and the encrypted data file is preserved in the external storage medium 41 and transmitted to the analyzing device 42 via the external storage medium 41, this is merely exemplary. For example, the portable reader device 40 may not be provided with the external storage medium attaching section 40c, and encrypted information may be transmitted to the analyzing device 42 via a network such as an internet or an intranet. Or, the portable reader device 40 containing the encrypted data file in the internal memory may be brought to the facility where the analyzing device 42 is placed.

The portable reader device 40 may include an electric wire (cable) through which electric power is supplied to the ECU 18 in addition to the signal line through which information is transmitted and received. This allows the electric power to be supplied from the power supply built into the portable reader device 40 to the ECU 18. Therefore, necessary information such as the event data and the history data can be obtained even when electric power cannot be supplied from the power supply of the vehicle such as the motorcycle 1 to the ECU 18.

The portable reader device 40 is capable of encrypting identification information used to identify the motorcycle 1 (vehicle) as well as the event data and the history data such that there is a correlation between the identification information and the event data and the like. Based on these data, the state of the fall can be analyzed more easily. For example, the identification information of the vehicle may include recognition information such as a model number of the ECU, a vehicle body number, model information, destination information, or an accumulated operation time.

Or, the portable reader device 40 may encrypt identification information individually assigned to the portable reader device 40 in addition to the event data and the history data. This can further improve credibility of the information. Or, the portable reader device 40 may encrypt identification information individually set for each operator which reads out the information using the portable reader device 40, together with the event data and the history data. This can further improve credibility of the information.

Preferably, the portable reader device 40 may encrypt identification information individually assigned to each of the ECU 18, the portable reader device 40, and the operator which reads out the information using the portable reader device 40, together with the event data and the history data. This can further improve credibility of the information. Or, when the event data and the history data are read using the portable reader device 40, an information reading process may be permitted, if the portable reader device 40 detects that a starting operation (unlocking operation) such as inputting a code number (password) which can be known by a particular person.

Although the event data and the history data are encrypted and written to the internal memory in the portable reader device 40 and to the external storage medium 41 after receiving the event data and the history data in the portable reader device 40 in the above embodiments, the received data may be written to the internal memory of the portable reader device 40 without encryption. After the event data and the history data are read out from the internal memory, they may be encrypted when they are written to the external storage medium 41 or transmitted to the analyzing device 42.

Although in the EDR 20 of the above embodiments, the number of times the event data is recorded is restricted, it may not be restricted. In view of the purpose of understanding the state of the falling of the motorcycle 1 and analyzing the state of the fall, the event data may be recorded and the history data may not be recorded, instead of recording both the event data and the history data. In this case, a storage capacity of the event data may be increased to correspond to a storage area of the history data.

Although the EDR 20 of the present invention is used to understand and analyze the state of the fall of the motorcycle 1, it may be used for another purpose. For example, the EDR 20 may be used to analyze a failure in the motorcycle 1, or to confirm a driving skill Or, the EDR 20 may be used for various performance evaluations in contests of fuel efficiency in driving, driving distance, or safe driving, etc.

Although in the above described embodiments, the motorcycle has been described, the present invention is also applicable to vehicles which have a substantial weight and are difficult to transport to the facility, such as a personal watercraft (PWC), or a straddle-type all terrain vehicle. The driving power source of the vehicle may be the engine E, as in the above embodiments, an electric motor, or the engine E and an electric motor (in hybrid vehicle). Moreover, the present invention may be intended for only the event data recorder, the vehicle incorporating the event data recorder, or a control method and a control program of the event data recorder, as well as the information obtaining system.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An information obtaining system in a straddle-type vehicle comprising:
   a nonvolatile memory built into the vehicle, event data of the vehicle relating to the vehicle being stored in the nonvolatile memory;
   a portable reader device which is not incorporated into the vehicle and can be carried by a person, the portable reader device being configured to read out the event data from the nonvolatile memory, encrypt the event data, and store the encrypted event data, and being configured to output the encrypted event data, preserve downloaded event data in the form of the encrypted data and have no function for decrypting the encrypted data to be unable to chance or display contents of the event data on the portable reader device; and
   an analyzing device which is not incorporated into the vehicle, the analyzing device being separate from the portable reader device, and configured to decrypt the encrypted event data output from the portable reader device into the event data.

2. The information obtaining system in the straddle-type vehicle according to claim 1,
   wherein abnormal state information relating to an abnormal state of the vehicle and identification information used to identify the vehicle are stored in the nonvolatile memory as event data.

3. The information obtaining system in the straddle-type vehicle according to claim 2,
wherein a number of times the abnormal state information is recorded is restricted to a preset number.

4. The information obtaining system in the straddle-type vehicle according to claim 1,
wherein the nonvolatile memory is removably mounted to a controller for controlling an operation of the vehicle.

5. The information obtaining system in the straddle-type vehicle according to claim 1,
wherein the nonvolatile memory is not rewritable.

6. The information obtaining system in the straddle-type vehicle according to claim 1,
wherein abnormal state information relating to an abnormal state of the vehicle and normal state information relating to a normal state of the vehicle are stored in the nonvolatile memory as event data.

7. The information obtaining system in the straddle-type vehicle according to claim 6,
wherein the normal state information per unit time stored in the nonvolatile memory is less in amount than the abnormal state information per unit time stored in the nonvolatile memory.

8. The information obtaining system in the straddle-type vehicle according to claim 1, further comprising:
an event data recorder incorporated into the vehicle and including the nonvolatile memory, data output from devices incorporated into the vehicle being stored in the nonvolatile memory, the event data recorder further including:
a determiner system for determining whether or not the vehicle has fallen;
a detecting system for detecting that a rotational speed of a drive system coupled to a driving wheel of the vehicle is equal to or higher than a predetermined value; and
a controller for controlling the nonvolatile memory such that storing of the data output from the devices is initiated if the determiner system determines that the vehicle has fallen and the detecting system detects that the rotational speed of the drive system is equal to or higher than the predetermined value.

9. The information obtaining system in the straddle-type vehicle according to claim 8,
wherein the vehicle includes a temporal storage device for storing as time-series data, at least first information relating to a driver's operation of the vehicle and included in the data output from the devices such that the first information is updated; and
the controller is configured to read out from the temporal storage device, the data output from the devices during a period of time between a time point when storing of the data in the nonvolatile memory is initiated and a time point that is a predetermined time back from the time point when storing of the data in the nonvolatile memory was initiated.

10. The information obtaining system in the straddle-type vehicle according to claim 9,
wherein the controller controls the nonvolatile memory such that at least second information relating to a moving state of the vehicle and included in the data output from the devices is stored in the nonvolatile memory, irrespective of a result of the determination performed by the determiner system and a result of the detection performed by the detecting system.

11. The information obtaining system in the straddle-type vehicle according to claim 10,
wherein the second information per unit time stored in the nonvolatile memory is less in amount than the first information per unit time stored in the nonvolatile memory.

12. The information obtaining system in the straddle-type vehicle according to claim 10,
wherein the second information includes information relating to a number of times the vehicle has fallen.

13. The information obtaining system in the straddle-type vehicle according to claim 9,
wherein a number of times the first information is recorded is restricted to a preset number.

14. The information obtaining system in the straddle-type vehicle according to claim 9,
wherein the vehicle further includes the driving wheel and a driven wheel; and
the first information includes information relating to a rotational speed of the driven wheel.

15. The information obtaining system in the straddle-type vehicle according to claim 1,
wherein the nonvolatile memory has two storage areas for mirroring.

16. The information obtaining system in the straddle-type vehicle according to claim 1,
wherein data of identification information used to identify the vehicle is stored in the nonvolatile memory together with the event data.

17. The information obtaining system in the straddle-type vehicle according to claim 1,
wherein the portable reader device is capable of reading out information other than the event data from the nonvolatile memory and does not encrypt the information to enable the portable reader device to display the unencrypted information on the portable reader device.

18. The information obtaining system in the straddle-type vehicle according to claim 1,
wherein the portable reader device is capable of reading out history data indicating the normal use state of the user from the nonvolatile memory.

19. The information obtaining system in the straddle-type vehicle according to claim 1,
wherein the nonvolatile memory is capable of storing and outputting history data together with the event data.

* * * * *